//2

United States Patent Office 3,072,729
Patented Jan. 8, 1963

3,072,729
PREPARATION OF VINYL ACETALS
Saburo Hattori, Tokyo, Japan, assignor to Mitsubishi Chemical Industries, Ltd., Tokyo, Japan, a company of Japan
No Drawing. Filed Oct. 22, 1956, Ser. No. 617,243
Claims priority, application Japan Nov. 9, 1955
15 Claims. (Cl. 260—615)

This invention relates to the new compounds, vinyl acetals, and the preparation method of the same; and in particular, the invention relates to the preparation of vinyl acetals, especially dimer to tetramer of vinyl ethers by performing addition reaction of vinyl ethers.

It is known that vinyl ethers perform ionic polymerization in the presence of Friedel-Crafts type catalyst, for example, boron trifluoride, and forms polymers. It is also known that vinyl ethers react with acetals in the presence of boron trifluoride catalyst and produce telomers of alkoxy acetal type.

After various studies made as to the reactivity of vinyl ethers, I have found out that vinyl ethers perform addition reaction in the presence of certain catalysts, and vinyl acetals are produced thereby. Such addition reaction is worthwhile noticing as a novel reaction of vinyl ethers.

It is the object of the present invention to manufacture, with industrial advantages, vinyl acetals, novel and valuable compounds as raw material for 1-alkoxybutadiene or tetraalkoxypropane.

The object of the present invention is accomplished by performing an addition reaction of alkyl vinyl ether, under reaction conditions, in the presence of a mixed catalyst of mercury compound and fluorine compound or a single catalyst of mercury fluoride, whereby vinyl acetals are fractionally distilled from the reaction mixture.

In accordance with the invention, a mixed catalyst composed, for example, of boron trifluoride etherate and mercuric oxide is added to acetone. Vinyl ether, such as ethyl vinyl ether, is added thereinto under cooling. After a while, the reaction mixture becomes clear. By adding further ethyl vinyl ether, the reaction is completed. After neutralizing the catalyst with alkali, such as sodium carbonate, the reacted mixture is fractionally distilled. I obtain the first fraction boiling at 71.5° C./60 mm. Hg, the second fraction boiling at 88° C./4.5 mm. Hg, the third fraction boiling at 108–110° C./2 mm. Hg, and higher boiling products.

The first fraction:

Specific gravity: $d_4^{30}=0.8382$
Refractive index: $n_D^{30}=1.4047$
Molecular refraction: $MR_D=42.13$ It was confirmed that:

(1) The value of elementary analysis corresponds to that of ethyl vinyl ether. Calculated for $C_8H_{16}O_2$: C, 66.63; H, 11.18. Found: C, 66.94; H, 11.42.

(2) By hydrogenating the product with Raney nickel catalyst, 1 mol of hydrogen is absorbed per mol of the product, and butyraldehydeacetal is obtained quantitatively. This shows that one double bond is present in the molecule, said molecule consisting of two molecules of ethyl vinyl ether, and the skeleton thereof being:

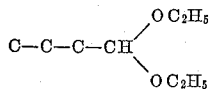

(3) According to the infra-red spectrum, a remarkable absorption is conceived at 915 cm.$^{-1}$ and 995 cm.$^{-1}$, showing the presence of one group $CH_2=CH-$. A characteristic absorption of acetal group and double bond is also recognized.

(4) By reacting the product with ozone, and catalytically reducing the obtained ozonide, and then treating the reacted mixture with 2,4-dinitrophenylhydrazine, N-2,4-dinitrophenylpyrazol melting at 109–111° C. is obtained. No depression is perceived by mixing and melting the above with a pure N-2,4-dinitrophenylpyrazol which has been formed with malondialdehyde and 2,4-dinitrophenylhydrazine. Also, by treating the above reacted mixture with dimedone, a methylene dimedone melting at 189° C. is obtained. No depression is perceived by mixing and melting the above with a pure methylene dimedone. This shows that a vinyl group is present in the molecule.

It was determined that the first fraction was the dimer of ethyl vinyl ether, 4,4-diethoxy-butene-(1), a novel compound, never reported in the literature, having the structural formula:

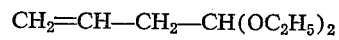

The second fraction:

Specific gravity: $d_4^{30}=0.8814$
Refractive index: $n_D^{30}=1.4213$
Molecular refraction: $MR_D=62.27$ It was determined that the second fraction was the trimer of ethyl vinyl ether, 4,6,6-triethoxy-hexene-(1), a novel product, never reported in the literature, having the structural formula:

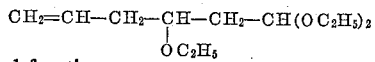

The third fraction:

Specific gravity: $d_4^{30}=0.9087$
Refractive index: $n_D^{30}=1.4328$
Molecular refraction: $MR_D=82.46$ It was determined that the third fraction was the tetramer of ethyl vinyl ether, 4,6,8,8-tetraethoxy-octene-(1), a novel product, never reported in the literature, having the structural formula:

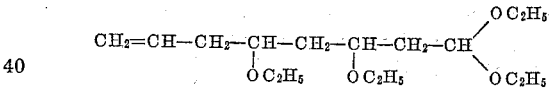

The higher boiling products:
The products comprising the higher units of vinyl ethers were obtained.

Thus, by the method of the present invention, I can obtain a dimer to tetramer of ethyl vinyl ether, shown by the general formula:

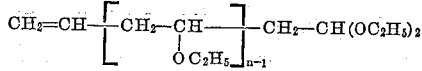

where $n$ represents 1, 2 or 3.

Hereinabove, I have described the addition reaction of ethyl vinyl ether. Similar results can be obtained with other vinyl ether, such as methyl vinyl ether, isopropyl vinyl ether, and n-butyl vinyl ether.

The presence of vinyl groups in such telomers has all been confirmed by the infra-red spectrum, and by the catalytic reduction made in the presence of Raney nickel catalyst, the theoretical amount of hydrogen to the assumed structural formula is absorbed. The infra-red spectrum of these hydrogenated products is the same as that of the known telomers, which are formed with butyraldehyde acetals and vinyl ethers, and therefore, are the same compounds. Namely, it was confirmed that a dimer to tetramer of vinyl ether, having the general structural formula:

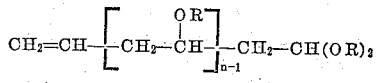

where R is alkyl group, and $n$ is 1, 2 or 3, is formed.

The physical constants of such dimers to tetramers of vinyl ether are shown in the following table:

| Structural formula | Boiling point (° C./mm. Hg) | Refractive index $(n_4^{30})$ | Specific gravity $(d_4^{30})$ | Molecular refraction $(MR_D)$ |
|---|---|---|---|---|
| $CH_2=CH-CH_2-CH(OCH_3)_2$ | 61.2–61.8° C./120 mm. Hg | 1.4010 | 0.8652 | 32.63 |
| $CH_2=CH-CH_2-CH(OC_2H_5)_2$ | 71.5° C./60 mm. Hg | 1.4047 | 0.8382 | 42.13 |
| $CH_2=CH-CH_2-CH(OC_3H_7(iso))_2$ | 61.0° C./20 mm. Hg | 1.4084 | 0.8251 | 51.49 |
| $CH_2=CH-CH_2-CH(OC_4H_9(n))_2$ | 74.5–75.0° C./4 mm. Hg | 1.4215 | 0.8369 | 60.72 |
| $CH_2=CHCH_2\overset{OCH_3}{C}HCH_2CH(OCH_3)_2$ | 79.0° C./15 mm. Hg | 1.4230 | 0.9195 | 48.24 |
| $CH_2=CHCH_2\overset{OC_2H_5}{C}HCH_2CH(OC_2H_5)_2$ | 72.0° C./1.5 mm. Hg | 1.4213 | 0.8814 | 62.27 |
| $CH_2=CH-[CH_2\overset{OCH_3}{C}H-]_2CH_2CH(OCH_3)_2$ | 82.5–83.5° C./1.5 mm. Hg | 1.4369 | 0.9528 | 63.87 |
| $CH_2=CH-[CH_2\overset{OC_2H_5}{C}H-]_2CH_2CH(OC_2H_5)_2$ | 108.0–110.0° C./2 mm. Hg | 1.4328 | 0.9087 | 82.46 |

In the present invention, the reaction temperature must be chosen relative to the kind and composition of raw material and catalyst and also the reaction time. The reaction can effectively be performed in general at a temperature of −10° C. to 50° C., preferably at 0° C. to 30° C., under atmospheric pressure. At a higher temperature, the formation of higher boiling products, such as trimer and tetramer, increases. Generally, at a lower temperature, the reaction velocity is lowered.

As catalysts of the present invention, mercurous fluoride, mercuric fluoride, and also mixed catalyst of mercury compound and fluorine compound can be used. As fluorine compound, one component af the mixed catalyst, boron trifluoride, boron trifluoride complex, hydrogen fluoride and dioxyfluoboric acid are preferable; and as mercury compound, the other component of the mixed catalyst, mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthalate are preferable.

When mercury fluoride is solely used as catalyst, the reaction can be performed by adding the same directly in vinyl ether. However, mercury fluoride can be suspended in an ordinary organic solvent, and vinyl ether can be added thereto. When a mixed catalyst composed, for example, of boron trifluoride complex and mercuric oxide is used, the reaction can be performed quite effectively in an ordinary organic solvent. As organic solvent, alcohols and ketones are preferred, because the reaction can be proceeded smoothly. To make the stirring easier, the reaction can be performed by adding organic solvents, such as aliphatic hydrocarbons, aromatic hydrocarbon, ethers, esters and fatty acids, with or without alcohols and ketones. Vinyl acetals obtained by this invention can also be used as solvent. The optimum amount, to be used, of ketones and other solvents is 1/10 to 1/20 by weight of vinyl ether. In case alcohols are used, an adequate amount shall be chosen to avoid a side reaction to be caused by alcohols and vinyl ethers; and it is desirable to use alcohols having the same kind of alkyl group as that of vinyl ethers for obtaining vinyl acetals having the same kind of alkyl group.

In case a mixed catalyst is used, 0.01 to 0.001 mol of mercury and 0.003 to 0.0003 mol of fluorine, preferably 0.003 to 0.007 mol of mercury and 0.001 to 0.002 mol of fluorine can be used per mol of vinyl ether. In case a single catalyst is used, 0.02 to 0.001 mol, preferably 0.003 to 0.007 mol of mercury fluoride can be used per mol of vinyl ether. When a mixed catalyst is used, the excess of boron trifluoride and hydrogen fluoride causes polymerization. For this reason, it is desirable to use an excess of mercury compound, such as mercuric oxide.

The reaction mechanism of the present invention is assumed to be as follows:

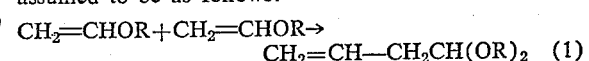

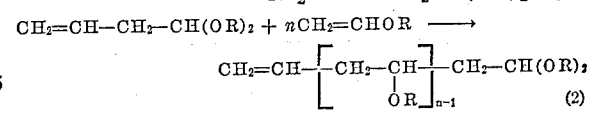

where R is same or different alkyl group, and $n$ shows 1, 2 or 3.

As described above, novel compounds, never reported in the literature, can be obtained, with industrial advantages, by a novel reaction of vinyl ether, and such novel compounds are useful as raw material for 1-alkoxybutadien and tetraalkoxypropane.

The invention is further illustrated, but not limited, by the following examples:

*Example I*

In a flask provided with a stirrer, a thermometer, a gas inlet tube and a gas outlet tube, 50 g. of acetone is introduced. A catalyst, prepared with 2 g. of mercuric acetate and 0.4 cc. of boron trifluoride methanolate is added thereto. The reaction mixture is vogorously stirred under cooling with ice water from outside, and 205 g. of methyl vinyl ether is introduced through the gas inlet tube at a temperature of 4–6° C. during 8 hours. Thereafter, the reaction is performed during 6 hours at a temperature below 10° C. Then, 2 g. of powdered anhydrous sodium carbonate is added. After stirring for 2 hours, the reacted mixture is filtered, and the filtrate is fractionated in a rectifier. A small amount of unreacted methyl vinyl ether is distilled off, and after recovering acetone, the solution is distilled at a slightly reduced pressure. 20 g. of the first fraction is separated, and then, by successively reducing the pressure, 144 g. of 4,4-dimethoxy-butene-(1), 20 g. of 4,6,6-trimethoxy-hexane-(1), 5 g. of 4,6,8,8-tetramethoxy-octene-(1) and 6 g. of higher boiling products are obtained.

*Example II*

In a flask as in Example I, 18.6 g. of 4,4-dimethoxy-butene-(1) as solvent, 2.1 g. of mercuric fluoride and 1.0 g. of methanol are introduced. 232 g. of methyl vinyl ether is led thereinto through the gas inlet tube during 6 hours at a temperature of 8–10° C. under the vigorous stirring while cooling from outside. Thereafter, the solution is left to stand at a temperature below 10° C. for one hour. Then, after having gradually been restored to room temperature, the solution is left to stand overnight. After adding 5 g. of powdered anhydrous sodium carbonate and stirring for 4 hours, the reacted mixture is treated as in Example I. 15.8 g. of the first fraction, including unreacted methyl vinyl ether, 217.9 g. of 4,4-dimethoxy-butene-(1) and 16.5 g. of the higher boiling products including trimer and tetramer of methyl vinyl ether are obtained.

*Example III*

In a flask provided with a stirrer, a thermometer, a dropping funnel and a reflux condenser, 11.6 g. of acetone is introduced. A catalyst prepared with 1 g. of mercuric formate and 0.2 cc. of boron, trifluoride etherate is added thereto. 144 g. of ethyl vinyl ether is dropped during 4 hours at a temperature of 24–26° C. under vigorous stirring. Thereafter, the solution is left to stand at room temperature for 20 hours. Then, the reacted mixture is treated as in Example I. 112 g. of 4,4-diethoxy-butene-(1) is obtained.

*Example IV*

In a flask as in Example III, 116 g. of acetone is introduced. A catalyst prepared with 1.5 g. of mercuric benzoate and 0.2 cc. of boron trifluoride etherate is added thereto. 144 g. of ethyl vinyl ether is dropped during 4 hours at a temperature of 24–25° C. under vigorous stirring. Thereafter, the solution is left to stand for 20 hours. Then, the reacted mixture is treated as in Example I. 108 g. of 4,4-diethoxy-butene-(1) is obtained.

*Example V*

In a flask as in Example III, 58.0 g. of acetone is introduced. A catalyst prepared with 1 g. of mercuric oxide and 0.1 cc. of boron trifluoride etherate is added thereto. The solution is stirred under cooling with running water, and 216 g. of ethyl vinyl ether is dropped during 5.5 hours at a temperature of 25–27° C. Thereafter, the solution is left to stand at the same temperature for one hour, and then, the reacted mixture is treated as in Example I. 161 g. of 4,4-diethoxy-butene-(1), 7 g. of 4,6,6-triethoxy-hexene-(1), 3 g. of 4,6,8,8-tetraethoxyoctene-(1) and 4 g. of higher boiling products are obtained.

*Example VI*

In a flask as in Example III, a catalyst prepared with 4.6 g. of ethanol, 1 g. of mercuric oxide and 0.2 cc. of boron trifluoride etherate is introduced. 144 g. of ethyl vinyl ether is dropped thereinto during 3.5 hours at a temperature of 25–26° C. Thereafter, the solution is left to stand at room temperature for 20 hours. Then, the reacted mixture is treated as in Example I. 112 g. of 4,4-diethoxy-butene-(1) is obtained.

*Example VII*

In a flask as in Example III, 11.6 g. of acetone, 1 g. of mercuric oxide, 0.2 cc. of boron trifluoride etherate and 1 cc. of ethanol are introduced. 216 g. of ethyl vinyl ether is dropped thereinto during 4 hours at a temperature of 24–25° C. Thereafter, the solution is left to stand at the same temperature for 10 hours. Then, the reacted solution is treated as in Example I. 182 g. of 4,4-diethoxy-butene-(1) is obtained.

*Example VIII*

In a flask as in Example III, a catalyst prepared with 11.6 g. of acetone, 1 g. of mercuric acetate, 0.1 cc. of boron trifluoride etherate and 0.5 cc. of isopropanol is introduced. 172 g. of isopropyl vinyl ether is dropped thereinto during 4 hours at a temperature of 24–26° C. The solution is left to stand at room temperature for 10 hours. Thereafter, the reacted solution is treated as in Example I. 120 g. of 4,4-diisopropoxy-butene-(1) is obtained.

*Example IX*

In a flask as in Example III, a catalyst prepared with 11.6 g. of acetone, 1 g. of mercuric oxide, 0.2 cc. of boron trifluoride etherate and 0.5 cc. of butanol is introduced. 200 g. of butyl vinyl ether is dropped thereinto during 3.5 hours at a temperature of 24–25° C. The solution is left to stand at the same temperature for 6 hours. Thereafter, the reacted solution is treated as in Example I. 173 g. of 4,4-di-n-butoxy-butene-(1) is obtained.

*Example X*

In a flask as in Example III, a catalyst prepared with 20 g. of ethyl acetate, 1 g. of mercuric oxide, 0.2 cc. of boron trifluoride etherate and 1 g. of ethanol is introduced. 144 g. of ethyl vinyl ether is dropped thereinto during 4 hours at a temperature of 20° C. The solution is left to stand overnight at room temperature. Thereafter, the reacted mixture is treated as in Example I. 79.3 g. of 4,4-diethoxy-butene-(1) and 53.7 g. of higher boiling products are obtained.

*Example XI*

In a flask provided with a reflux condenser, 10 g. of ethyl vinyl ether is introduced. 0.5 g. of powdered mercuric fluoride is added thereto. The reaction immediately occurs. The solution is maintained at 30° C. under shaking while cooling the same. Thereafter, 62 g. of ethyl vinyl ether is added portionwise during one hour. The reacted solution is left to stand overnight, and then is treated as in Example I. 49 g. of 4,4-diethoxy-butene-(1) and 18 g. of higher boiling products are obtained.

I claim:
1. Vinyl acetals represented by the general formula:

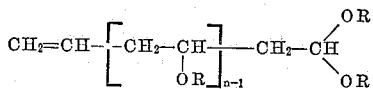

wherein R is a lower alkyl group, and $n$ is an integer from 1 to 3.
2. The compounds of claim 1 wherein $n$ is 1.
3. The compounds of claim 1 wherein $n$ is 2.
4. The compounds of claim 1 wherein $n$ is 3.
5. The compound of the formula

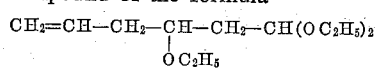

6. The compound of the formula

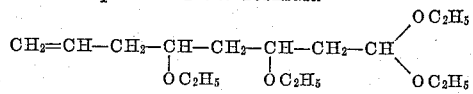

7. In a process for preparing vinyl acetals which have the general formula:

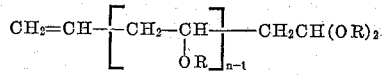

where $n$ is an integer from 1 to 3 and R is a lower alkyl radical, the step of reacting at from −10° C. to 50° C. under atmospheric pressure a vinyl ether having a lower alkyl group in the presence of catalyst, selected from the group consisting of single catalyst of mercury fluoride and mixed catalyst of mercury compound and fluorine compound, said mercury compound being a member selected from the group consisting of mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthaltae, and said fluorine compound being a member selected from the group consisting of boron trifluoride, boron trifluoride complex, hydrogen fluoride and dihydroxyfluoboric acid.

8. A process as in claim 7, in which 0.02 to 0.001 mol of mercury fluoride is used per mol of vinyl ether, as catalyst.

9. A process as in claim 7, in which 0.01 to 0.001 mol of mercury and 0.003 to 0.0003 mol of fluorine are used per mol of vinyl ether, as mixed catalyst.

10. In a process for preparing vinyl acetals which have the general formula:

$$CH_2=CH-\left[CH_2-CH-\atop OR\right]_{n-1}-CH_2CH(OR)_2$$

wherein $n$ is an integer from 1 to 3 and R is a lower alkyl radical, the step which comprises forming a mixture of a catalyst composed of a mercuric salt of an organic carboxylic acid and boron trifluoride with a vinyl ether having the formula:

$$ROCH=CH_2$$

where R is a lower alkyl radical at a temperature in the range of 0° C. to 50° C. to cause formation of said vinyl acetals.

11. In the preparation of vinyl acetals of the formula $$CH_2=CH-\left[CH_2-CH-\atop OR\right]_{n-1}-CH_2CH(OR)_2$$

where $n$ is an integer from 1 to 3 and R is lower alkyl, the step of reacting at from −10° C. to 50° C. under atmospheric pressure and in an organic solvent a vinyl ether having a lower alkyl group in the presence of catalyst selected from the group consisting of (a) single catalyst of mercury fluoride and (b) mixed catalyst of mercury compound and fluorine compound, said mercury compound being a member selected from the group consisting of mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthalate, and said fluorine compounds being a member selected from the group consisting of boron trifluoride, boron trifluoride complex, hydrogen fluoride and dihydroxyfluoboric acid.

12. In the preparation of vinyl acetals of the formula $$CH_2=CH-\left[CH_2-CH-\atop OR\right]_{n-1}-CH_2CH(OR)_2$$

where $n$ is an integer from 1 to 3 and R is lower alkyl, the step of reacting at from −10° C. to 50° C. under atmospheric pressure and in a mixture of organic solvents a vinyl ether having a lower alkyl group in the presence of catalyst selected from the group consisting of (a) single catalyst of mercury fluoride and (b) mixed catalyst of mercury compound and fluorine compound, said mercury compound being a member selected from the group consisting of mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthalate, and said fluorine compound being a member selected from the group consisting of boron trifluoride, boron trifluoride complex, hydrogen fluoride and dihydroxyfluoboric acid.

13. In the preparation of vinyl acetals of the formula $$CH_2=CH-\left[CH_2-CH-\atop OR\right]_{n-1}-CH_2CH(OR)_2$$

where $n$ is an integer from 1 to 3 and R is lower alkyl, the step of reacting at from −10° C. to 50° C. under atmospheric pressure and in acetone a vinyl ether having a lower alkyl group in the presence of catalyst selected from the group consisting of (a) single catalyst of mercury fluoride and (b) mixed catalyst of mercury compound and fluorine compound, said mercury compound being a member selected from the group consisting of mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthalate, and said fluorine compound being a member selected from the group consisting of boron trifluoride, boron trifluoride complex, hydrogen fluoride and dihydroxyfluoboric acid.

14. In the preparation of vinyl acetals of the formula $$CH_2=CH-\left[CH_2-CH-\atop OR\right]_{n-1}-CH_2CH(OR)_2$$

where $n$ is an integer from 1 to 3 and R is lower alkyl, the steps of reacting at from −10° to 50° C. under atmospheric pressure and in methanol a vinyl ether having a lower alkyl group in the presence of catalyst selected from the group consisting of (a) single catalyst of mercury fluoride and (b) mixed catalyst of mercury compound and fluorine compound, said mercury compound being a member selected from the group consisting of mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthalate, and said fluorine compound being a member selected from the group consisting of boron trifluoride, boron trifluoride complex, hydrogen fluoride and dihydroxyfluoboric acid.

15. In the preparation of vinyl acetals of the formula $$CH_2=CH-\left[CH_2-CH-\atop OR\right]_{n-1}-CH_2CH(OR)_2$$

where $n$ is an integer from 1 to 3 and R is lower alkyl, the step of reacting at from −10° to 50° C. under atmospheric pressure and in ethanol a vinyl ether having a lower alkyl group in the presence of catalyst selected from the group consisting of (a) single catalyst of mercury fluoride and (b) mixed catalyst of mercury compound and fluorine compound, said mercury compound being a member selected from the group consisting of mercurous oxide, mercuric oxide, mercuric nitrate, mercurous formate, mercuric formate, mercurous acetate, mercuric acetate, mercurous oxalate, mercuric oxalate, mercurous benzoate, mercuric benzoate, mercurous phthalate and mercuric phthalate, and said fluorine compound being a member selected from the group consisting of boron trifluoride, boron trifluoride complex, hydrogen fluoride and dihydroxyfluoboric acid.

References Cited in the file of this patent

UNITED STATES PATENTS

| | | |
|---|---|---|
| 2,192,015 | Nieuwland et al. | Feb. 27, 1940 |
| 2,573,678 | Saunders | Nov. 6, 1951 |
| 2,678,950 | Myers et al. | May 18, 1954 |

FOREIGN PATENTS

| | | |
|---|---|---|
| 378,544 | Great Britain | Aug. 18, 1932 |